(12) United States Patent
Mochizuki et al.

(10) Patent No.: US 11,199,207 B2
(45) Date of Patent: Dec. 14, 2021

(54) MOTION GUIDE DEVICE CLAMPER MECHANISM

(71) Applicants: THK CO., LTD., Tokyo (JP);
NABEYA BI-TECH KABUSHIKI KAISHA, Seki (JP)

(72) Inventors: Hiroaki Mochizuki, Tokyo (JP);
Hiroomi Kuribayashi, Tokyo (JP);
Keisuke Hagiwara, Tokyo (JP);
Masahiro Aoyama, Seki (JP)

(73) Assignees: THK CO., LTD., Tokyo (JP);
NABEYA BI-TECH KABUSHIKI KAISHA, Seki (JP)

( * ) Notice: Subject to any disclaimer, the term of this patent is extended or adjusted under 35 U.S.C. 154(b) by 304 days.

(21) Appl. No.: 16/492,360

(22) PCT Filed: Mar. 6, 2018

(86) PCT No.: PCT/JP2018/008535
§ 371 (c)(1),
(2) Date: Sep. 9, 2019

(87) PCT Pub. No.: WO2018/164109
PCT Pub. Date: Sep. 13, 2018

(65) Prior Publication Data
US 2021/0131465 A1 May 6, 2021

(30) Foreign Application Priority Data

Mar. 9, 2017 (JP) .............................. JP2017-044862
Feb. 19, 2018 (JP) .............................. JP2018-027046

(51) Int. Cl.
*F16C 29/06* (2006.01)
*F16B 2/16* (2006.01)
*F16C 29/10* (2006.01)

(52) U.S. Cl.
CPC ............ *F16B 2/16* (2013.01); *F16C 29/0642* (2013.01); *F16C 29/10* (2013.01)

(58) Field of Classification Search
CPC .... F16C 29/001; F16C 29/06; F16C 29/0633; F16C 29/0635; F16C 29/0638;
(Continued)

(56) References Cited

U.S. PATENT DOCUMENTS 4,417,771 A * 11/1983 Teramachi ............... B23Q 1/28
384/45
4,953,988 A * 9/1990 Tsukada ................... B23Q 1/28
384/45
(Continued)

FOREIGN PATENT DOCUMENTS

DE 102010045109 A1 * 3/2012 .......... F16C 29/0633
FR 2529974 A1 * 1/1984 ............ F16C 29/064
(Continued)

OTHER PUBLICATIONS

International Search Report dated Apr. 17, 2018, issued in counterpart International Application No. PCT/JP2018/008535 (2 pages).
(Continued)

*Primary Examiner* — Phillip A Johnson
(74) *Attorney, Agent, or Firm* — Westerman, Hattori, Daniels & Adrian, LLP

(57) ABSTRACT

The motion guide device clamper mechanism includes a clamper main body connected to the movable member, an inner face having a tapered shape so that the distance between the facing faces is narrower toward the end of one face of the track member, and one rolling member disposed between the facing faces of the one face of the track member and the inner face. The rolling member receives a pressing force toward a position where the distance between the facing faces of one face of the track member and the inner
(Continued)

face of the clamper main body is narrow, so that a frictional force based on the taper shape acts on the rolling member, and the restraint of the clamper main body with respect to the track member is performed. Further, a frictional force based upon the taper shape is released and the non-restraint of the clamper is performed.

15 Claims, 19 Drawing Sheets

(58) Field of Classification Search
CPC .............. F16C 29/064; F16C 29/0642; F16C 29/0645; F16C 29/0647; F16C 29/0652; F16C 29/0654; F16C 29/0657; F16C 29/0659; F16C 29/0661; F16C 29/0664; F16C 29/0669; F16C 29/0671; F16C 29/10; F16B 2/16
See application file for complete search history.

(56) References Cited

U.S. PATENT DOCUMENTS

| | | | | |
|---|---|---|---|---|
| 5,431,497 A | * | 7/1995 | Nonaka | F16C 29/004 384/45 |
| 5,460,452 A | * | 10/1995 | Hara | B23Q 1/28 384/45 |
| 6,336,528 B1 | * | 1/2002 | Rudy | B23Q 1/28 188/170 |
| 2013/0028546 A1 | | 1/2013 | Wako et al. | |

FOREIGN PATENT DOCUMENTS

| | | |
|---|---|---|
| FR | 2538473 A1 | 6/1984 |
| GB | 2134966 A | 8/1984 |
| JP | 8-62110 A | 3/1996 |
| JP | 2003-148463 A | 5/2003 |
| JP | 2008-32047 A | 2/2008 |
| JP | 2011-153669 A | 8/2011 |
| JP | 2015-197124 A | 11/2015 |
| JP | 2016-164418 A | 9/2016 |
| JP | 2018-31401 A | 3/2018 |
| WO | 2011/081209 A1 | 7/2011 |

OTHER PUBLICATIONS

Extended (Supplementary) European Search Report dated Feb. 25, 2020, issued in counterpart application No. 18764712.8. (10 pages).

* cited by examiner (I-I CROSS SECTION)

(II-II CROSS SECTION)

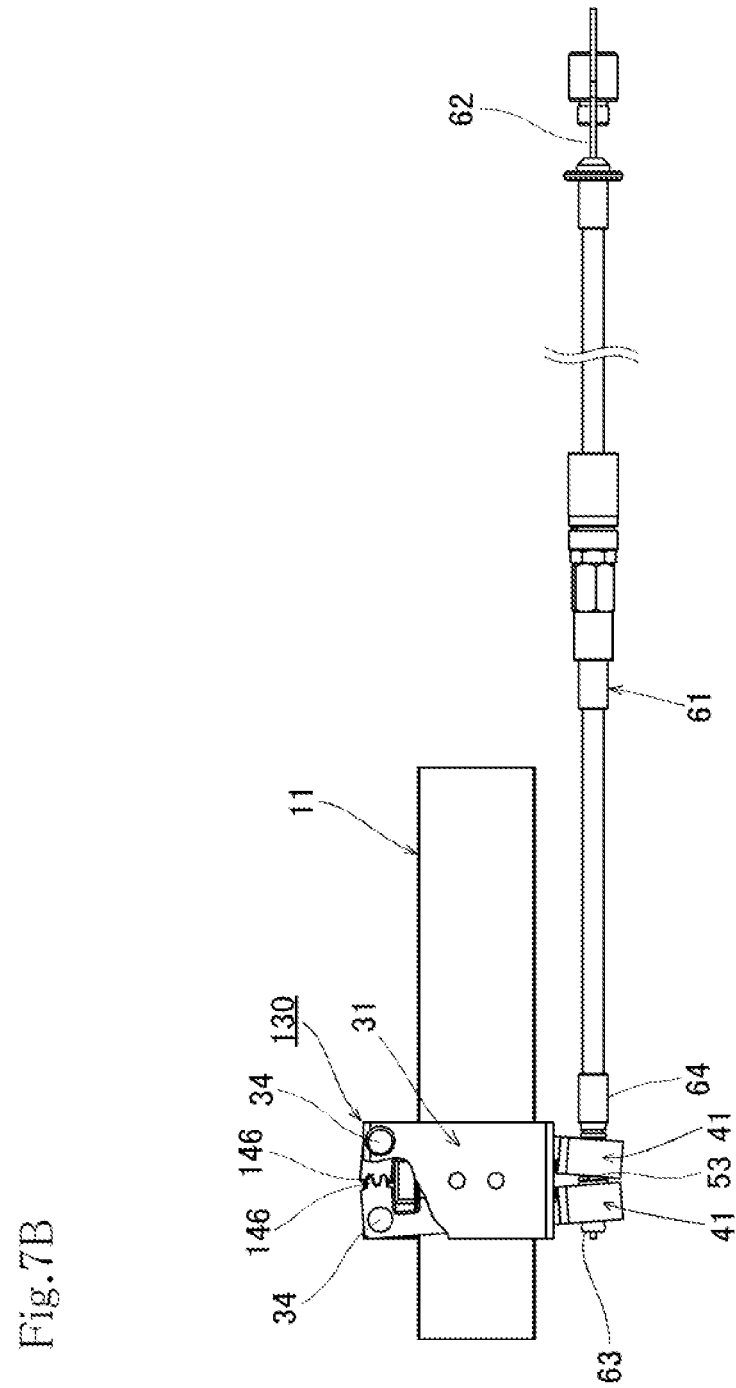

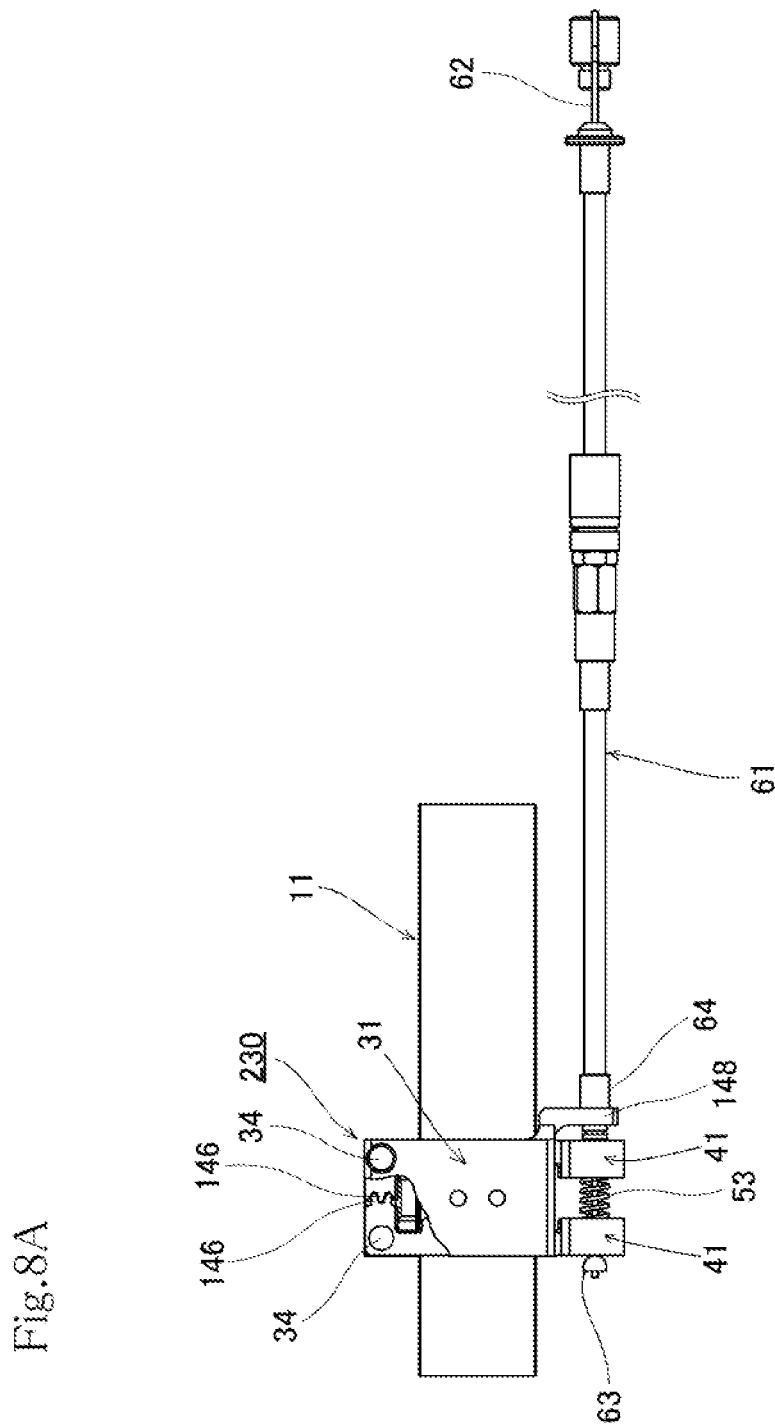

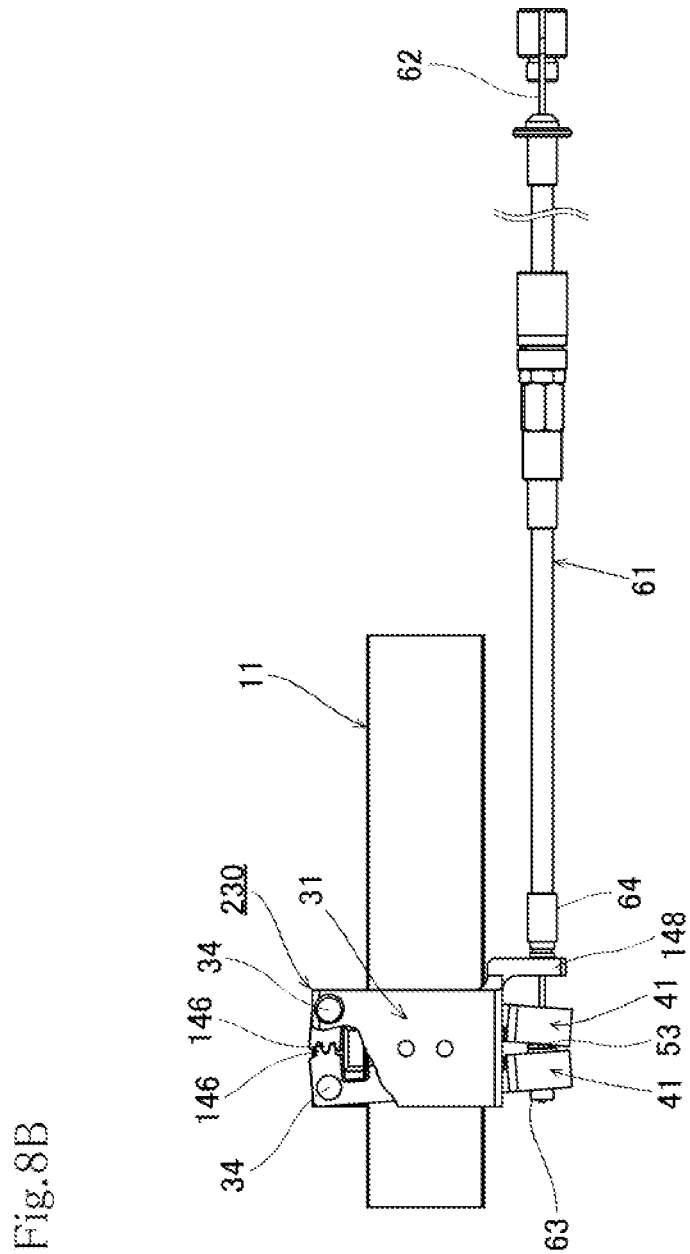

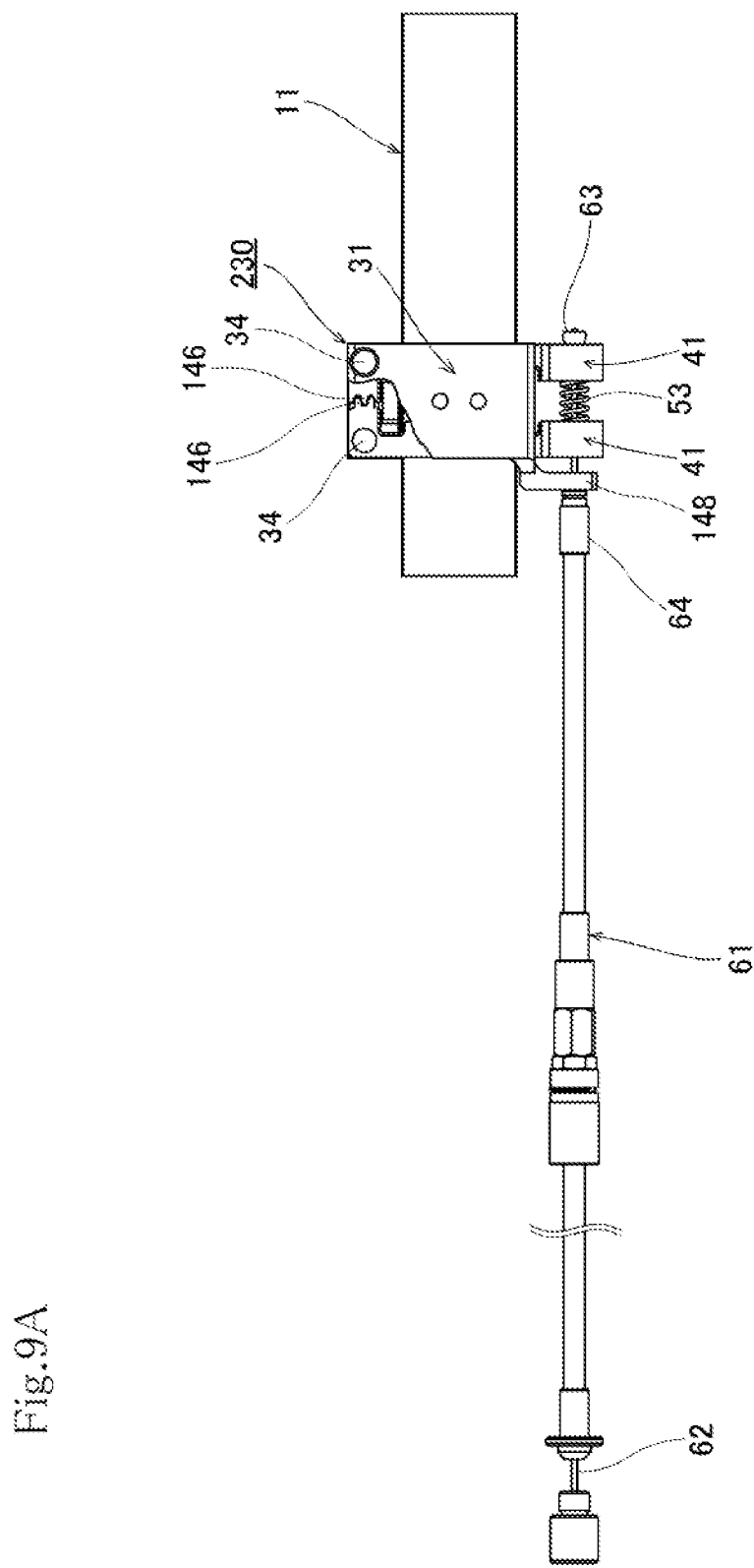

MOTION GUIDE DEVICE CLAMPER MECHANISM

TECHNICAL FIELD

The present invention relates to a clamper mechanism used in a motion guide device.

BACKGROUND ART

A motion guide device in which rolling members such as balls and rollers intervene in the guide portion as a mechanical element for guiding linear motion and curvilinear motion of a moving object such as a table, and the like provides an agile movement, so that it is used in various fields such as robots, machine tools, semiconductor/liquid crystal manufacturing devices, and medical devices.

A linear guide, a type of motion guide device, which has a track rail as a track member formed extending in the longitudinal direction, and a movable block as a movable member attached to the track rail via a plurality of rolling members is a device in which the movable block is relatively reciprocally movable in the longitudinal direction of the track rail. The track rail has rolling member rolling grooves extending along the longitudinal direction. On the other hand, the movable block has a loaded rolling member rolling groove facing the rolling member rolling groove, and has a rolling member circulation passage for circulating the rolling members. In addition, the rolling members are arranged between the rolling member rolling grooves of the track rail and the loaded rolling member rolling grooves of the movable block so as to be capable of rolling in a loaded state. When the movable block moves relatively linearly toward the track rail, the rolling members arranged between the track rail and the movable block perform a rolling motion, and circulate endlessly in the rolling member circulation passage.

In addition, the following Patent Literature 1 and the like exist as a technique in which this kind of motion guide device is disclosed.

CITATION LIST

Patent Literature

Patent Literature 1: JP 2011-153669 A

DISCLOSURE OF THE INVENTION

Problems to be Solved by the Invention

When a motion guide device such as the linear guide described above is used, there is a case where it is desired to position the movable block on the track rail at any position. In order to satisfy such a demand, in the prior art, generally, pin holes are opened in the track rail at regular intervals, and the position of the movable block is held by inserting a pin shaft into the pin hole.

However, in the conventional position holding means using the pin hole and the pin shaft, there are many restrictions on the holding position, and it is difficult to install the movable block on the track rail at any position.

On the other hand, although there are various clamper mechanisms generally used for conventional machine elements, there are many difficulties in simply applying the conventional clamper mechanism to a motion guide device such as a linear guide. For example, for the linear guide, since the track rail is attached to a base member such as a base and the guide object is attached to the movable block, it is necessary to apply a clamper mechanism that achieves both weight reduction and miniaturization at the same time in order to maintain a suitable guide accuracy and not to impede the movement of these attachment members. However, such a clamper mechanism has not existed conventionally.

The present invention has been made in view of the problems existing in the above-described prior art, and an object of the present invention is to provide a novel motion guide device clamper mechanism which achieves a weight reduction and a reduction in size simultaneously, which does not exist in the prior art and can be suitably used for the motion guide device such as a linear guide.

Means for Solving the Problems

A motion guide device clamper mechanism in accordance with the present invention includes a track member formed to extend in a longitudinal direction, and a movable member attached to the track member via a plurality of rolling members, the movable member being attached to a motion guide device relatively reciprocally movable in a longitudinal direction of the track member, the movable member being restrained/non-restrained at any position in the longitudinal direction of the track member to position the movable member with respect to the track member. The motion guide device clamper mechanism includes a clamper main body connected to the movable member, an inner face formed on the clamper main body, the inner face facing one face of the track member, and the inner face having a tapered shape in a manner in which a distance between facing faces is narrower toward an end of the one face of the track member, and one or more rolling members disposed between the facing faces of the one face of the track member and the inner face, wherein the one or more rolling members receives a pressing force toward a position where the distance between the facing faces of the one face of the track member and the inner face of the clamper main body is narrow, a frictional force based on the tapered shape acts on the one or more rolling members, and restraint of the clamper main body with respect to the track member is performed, wherein the frictional force based on the tapered shape is released by retracting the one or more rolling members from a position where the distance between the facing faces of the one face of the track member and the inner face of the clamper main body is narrow, and non-constraint of the clamper main body with respect to the track member is performed, and wherein further, a member for performing restraint/non-restraint of the clamper main body with respect to the track member is, when viewing the motion guide device from an upper face, formed to extend laterally beyond a dimension in a width direction of the track member, the width direction being a direction orthogonal to the longitudinal direction.

Another motion guide device clamper mechanism in accordance with the present invention includes a track member formed to extend in a longitudinal direction, and a movable member attached to the track member via a plurality of rolling members, the movable member being attached to a motion guide device relatively reciprocally movable in a longitudinal direction of the track member, the movable member being restrained/non-restrained at any position in the longitudinal direction of the track member to position the movable member with respect to the track member. The motion guide device clamper mechanism includes a clamper main body together with the movable member reciprocally movable along the longitudinal direction of the track member, and a pair of shaft-shaped arm members attached to the clamper main body, wherein each of the pair of arm members is attached to the clamper main body at one end of each of the shaft-shaped arm members via one pivot shaft, and is made to be pivotable around a line perpendicular to the longitudinal direction of the track member as a pivot axis, wherein an elastic body having an elastic force so as to be sandwiched by the pair of arm members at the other ends of the shaft-shaped arm members is installed, the pair of arm members pivots ordinarily by an elastic force exerted by the elastic body in a direction in which the other ends of the pair of arm members are away from or come close to each other, and when receiving an external force against the elastic force exerted by the elastic body, the pair of arm members pivots in a direction in which the other ends of the pair of arm members come close to or are away from each other, and is made to be pivotable around the line perpendicular to the longitudinal direction of the track member as the pivot axis, wherein one or more rolling members are disposed in a freely rolling state between the pivot axis and an installation position of the elastic body of each of the shaft-shaped arm members, wherein the one or more rolling members are disposed between facing faces of one face of the track member and an inner face formed on the clamper main body, wherein further, the inner face of the clamper main body is formed to have a tapered shape in a manner in which a distance between the facing faces is narrower toward an end of the one face of the track member, wherein when the pair of arm members pivots in a direction in which the other ends of the pair of arm members are away by an elastic force exerted by the elastic body or an external force against the elastic force exerted by the elastic body, a frictional force based on the tapered shape acts on the one or more rolling members, the one or more rolling members receiving the elastic force toward a position where the distance between the facing faces of the one face of the track member and the inner face of the clamper main body is narrow, and restraint of the clamper main body with respect to the track member is performed, wherein when the pair of arm members pivots in a direction in which the other ends of the pair of arm members come close by an elastic force exerted by the elastic body or an external force against the elastic force exerted by the elastic body, a frictional force based on the tapered shape is released by retracting the one or more rolling members from a position where the distance between the facing faces of the one face of the track member and the inner face of the clamper main body is narrow, and non-restraint of the clamper main body with respect to the track member is performed.

Effects of the Invention

According to the present invention, a novel motion guide device clamper mechanism which achieves a weight reduction and a reduction in size simultaneously, which does not exist in the prior art and which can be suitably used for the motion guide device such as a linear guide can be provided.

BRIEF DESCRIPTION OF THE DRAWINGS

FIG. 7B is a partially cutaway view showing one of various improvements which can be taken by the motion guide device clamper mechanism in accordance with the present invention, showing a non-restrained state of the clamper main body with respect to the track rail.

FIG. 8A is a partially cutaway view showing another improvement of the motion guide device clamper mechanism in accordance with the present invention, showing a restrained state of the clamper main body with respect to the track rail.

FIG. 8B is a partially cutaway view showing another improvement of the motion guide device clamper mechanism in accordance with the present invention, showing a non-restrained state of the clamper main body with respect to the track rail.

FIG. 9A is a diagram showing a modification of the motion guide device clamper mechanism according to another modification in accordance with the present invention shown in FIG. 8A and FIG. 8B, showing a restrained state of the clamper main body with respect to the track rail.

MODE FOR CARRYING OUT THE INVENTION

Hereinafter, preferred embodiments for carrying out the present invention will be described with reference to the drawings. The following embodiments do not limit the invention according to each claim, and all combinations of features described in the embodiments are not necessarily essential to the means for solving the invention.

Figure 1:
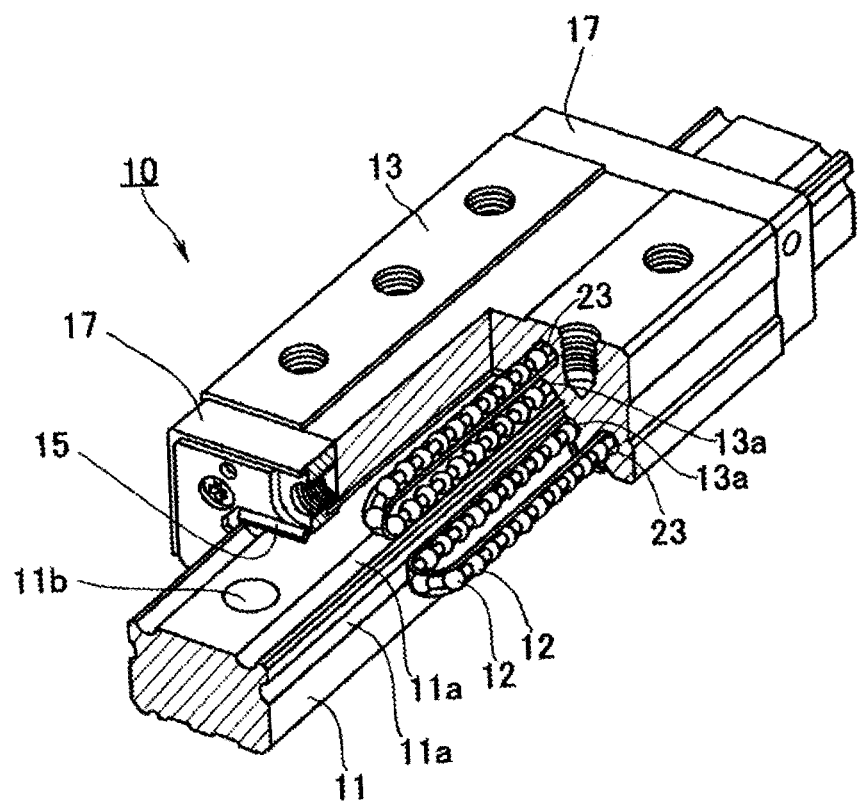
FIG. 1 is an external perspective view illustrating one form of a linear guide which is a motion guide device that can include the motion guide device clamper mechanism in accordance with the present embodiment.

First, the overall configuration of a linear guide 10 as a motion guide device that can include a motion guide device clamper mechanism 30 in accordance with the present embodiment will be described with reference to FIGS. 1 and 2. Here, FIG. 1 is an external perspective view illustrating one form of the linear guide which is a motion guide device which can include the motion guide device clamper mechanism in accordance with the present embodiment. Moreover, FIG. 2 is a sectional view for demonstrating the endless circulation passage with which the linear guide shown in FIG. 1 is provided.

Figure 2:
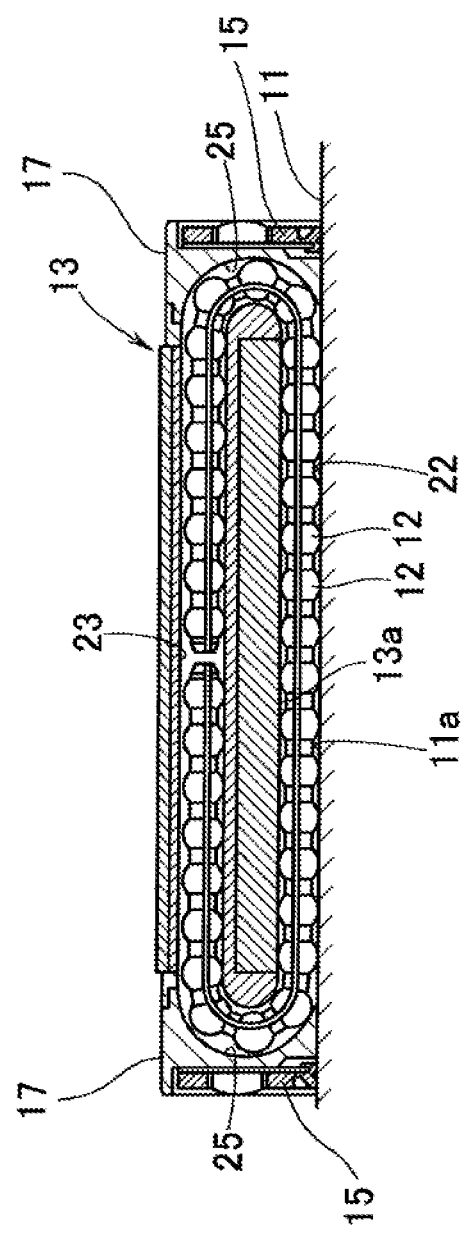
FIG. 2 is a cross-sectional view for explaining an endless circulation passage provided in the linear guide shown in FIG. 1 in accordance with an embodiment of the present invention.

The linear guide 10 shown in FIGS. 1 and 2 includes a track rail 11 as a track member and a movable block 13 as a movable member slidably attached to the track rail 11 via balls 12 installed as a large number of rolling members. The track rail 11 has bolt holes 11b for attaching the track rail 11 to the base members, such as a base at equal intervals with bolts as mounting means passed through from the upper face to the lower surface of the track rail 11, so that the track rail 11 can be fixedly installed, by using the bolt holes 11b, on the base member or the like which is a reference surface. Further, the track rail 11 is a long member whose cross section orthogonal to the longitudinal direction is formed in a substantially rectangular shape, and on the surface (upper face and both side faces), a rolling member rolling groove 11a as a track surface which is a track when the balls 12 roll is formed over the entire length of the track rail 11.

The track rail 11 may be formed to extend linearly or may be formed to extend curvilinearly. In addition, although the number of rolling member rolling grooves 11a illustrated in FIGS. 1 and 2 is a total of four in two on the left and two on the right, the number of the grooves may be changed according to the application of the linear guide 10 or the like.

On the other hand, the movable block 13 is provided with a loaded rolling member rolling groove 13a as a track surface at a position each corresponding to the rolling member rolling groove 11a. A loaded rolling member rolling passage 22 is formed by the rolling member rolling groove 11a of the track rail 11 and the loaded rolling member rolling groove 13a of the movable block 13, and a plurality of balls 12 is sandwiched therebetween. Further, the movable block 13 is provided with four non-loaded rolling member rolling passages 23 extending in parallel with the respective rolling member rolling grooves 11a in the inside thereof.

Furthermore, a pair of lids 17 and 17 is installed at the both ends of the movable block in the movement direction. Each of the pair of lids 17 and 17 is provided with a turnabout passage 25. The turnabout passage 25 is configured to be able to connect the end of the non-loaded rolling member rolling passage 23 and the end of the loaded rolling member rolling passage 22. Therefore, one endless circulation passage is configured by a combination of one loaded rolling member rolling passage 22 and one non-loaded rolling member rolling passage 23 and a pair of turnabout passages 25 and 25 connecting them (see FIG. 2).

Then, the plurality of balls 12 is installed so as to be infinitely circulating in the endless circulation passage constituted by the loaded rolling member rolling passage 22, the non-loaded rolling member rolling passage 23 and the pair of turnabout passages 25 and 25, so that the movable block 13 can reciprocate relatively to the track rail 11.

Further, a pair of end seals 15 and 15 as sealing members is provided on the pair of lids 17 and 17 respectively so as to close the gap between the movable block 13 and the track rail 11 outside the pair of turnabout passages 25 and 25. The end seal 15 can be provided with a lip at a contact point with the track rail 11, and the lip or the end seal 15 itself slidingly contacts the track rail 11 without a gap, so that it is possible to give a dustproof effect on the linear guide 10.

Figure 3A:
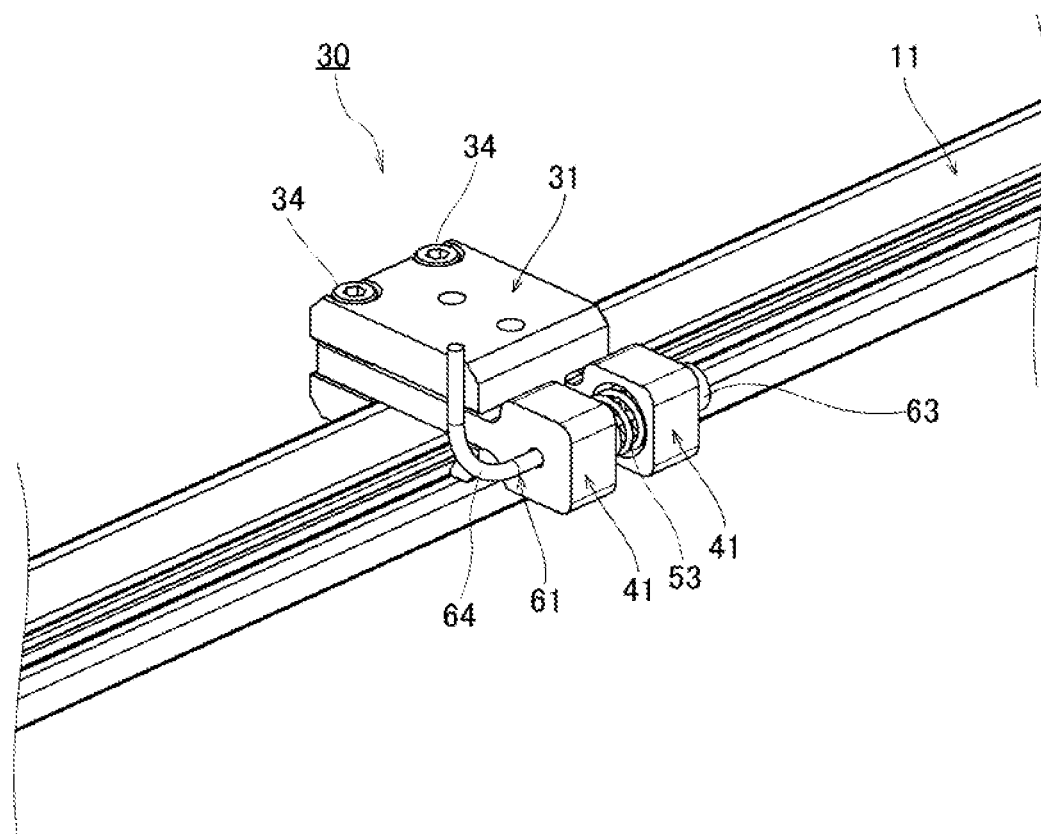
FIG. 3A is an external perspective view of these motion guide device clamper mechanism in accordance with the present embodiment, as viewed from diagonally above on the front side.
Figure 3B:
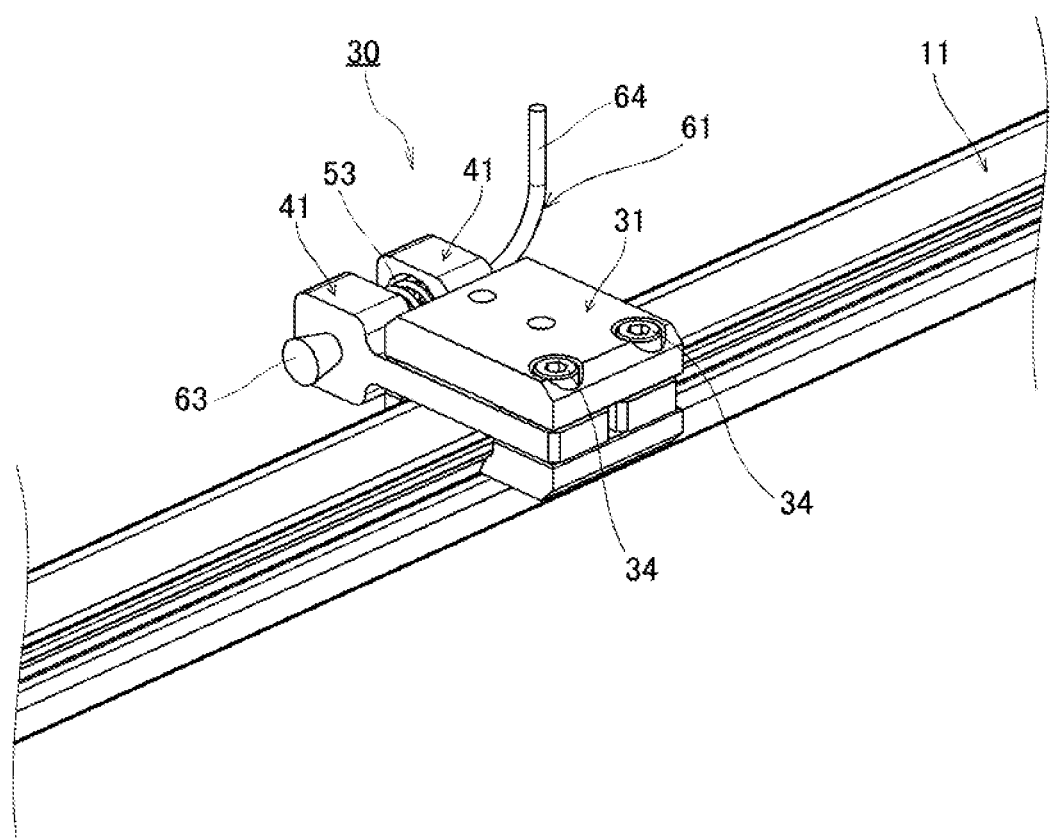
FIG. 3B is an external perspective view of the motion guide device clamper mechanism in accordance with the present embodiment as viewed from diagonally above on the back side.
Figure 4:
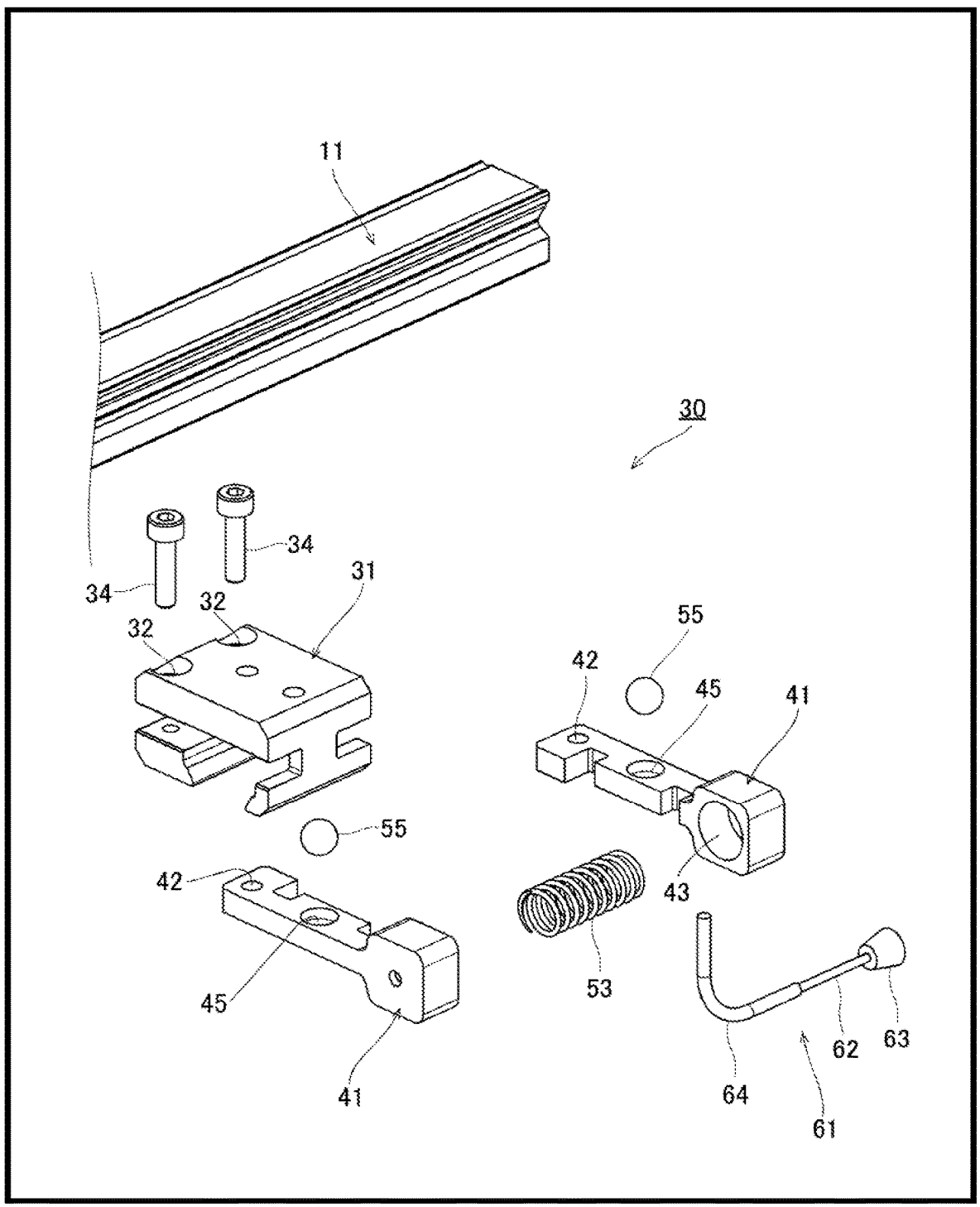
FIG. 4 is an exploded perspective view of a motion guide device clamper mechanism in accordance with the present embodiment.

In the above, the whole structure of linear guide 10 which can include a motion guide device clamper mechanism in accordance with the present embodiment is described. Next, a basic configuration of the motion guide device clamper mechanism 30 in accordance with the present embodiment that can be suitably used for the above-described linear guide 10 will be described with reference to FIGS. 3A, 3B, and 4. Here, FIG. 3A is an external perspective view of the motion guide device clamper mechanism in accordance with the present embodiment as viewed from diagonally above on the front side, and FIG. 3B is an external perspective view of the motion guide device clamper mechanism in accordance with the present embodiment as viewed from diagonally above on the back side. Further, FIG. 4 is an exploded perspective view of the motion guide device clamper mechanism in accordance with the present embodiment.

The motion guide device clamper mechanism 30 in accordance with the present embodiment includes a clamper main body 31 that can be freely reciprocated with the movable block 13 along the longitudinal direction of the track rail 11 and a pair of shaft-shaped arm members 41 and 41 attached to the clamper main body 31.

The clamper main body 31 is configured as a substantially inverted U-shaped member when viewed from the side, that is, when viewed from the axial direction along the longitudinal direction of the track rail 11. The lower part of the clamper main body 31, that is, the open side of the substantially inverted U-shaped "U" character, is configured to have a shape following the shape of the upper part of the track rail 11, so that the clamper main body 31 is capable of reciprocating along the longitudinal direction of the track rail 11 by fitting the lower part of the clamper main body 31 into the upper part of the track rail 11. In addition, since the track rail 11 and the clamper main body 31 are attached by the action of the shape corresponding to each other, the clamper main body 31 can reciprocate while slidingly contact the track rail 11.

Further, the pair of arm members 41 and 41 is attached to the clamper main body 31. Each of the pair of arm members 41 and 41 is a shaft-shaped arm member. The arm member 41 has a shaft hole 42 on one end side (upper left side of the paper in FIG. 4). Further, the clamper main body 31 also has an attachment hole 32 corresponding to the shaft hole 42 of the arm member 41, and a pivot shaft 34 is installed by insertion with respect to the attachment hole 32 and the shaft hole 42. Therefore, each of the pair of arm members 41 and 41 is attached to the clamper main body 31 via the one pivot shaft 34 at one end of the shaft-shaped arm member 41, so that each of the pair of arm members 41 and 41 is rotatable about a line perpendicular to the longitudinal direction of the track rail 11 as a pivot axis.

On the other hand, an attachment hole 43 for installing a coil spring 53 which is an elastic body having an elastic force is formed at the other end (the lower right side of the paper in FIG. 4) of the shaft-shaped arm member 41. As shown in FIGS. 3A and 3B, the coil spring 53 is inserted into the attachment holes 43 and 43 that the pair of arm members 41 and 41 has respectively, and the coil spring 53 is installed so as to be sandwiched by the pair of arm members 41 and 41, so that the pair of arm members 41 and 41 pivots in the direction in which the other ends of the pair of arm members 41 and 41 (that is, the coil spring 53 installation side) are constantly away from each other by the elastic force exerted by the coil spring 53. Further, the pair of arm members 41 and 41 pivots in the direction in which the other ends of the pair of arm members 41 and 41 (that is, the coil spring 53 installation side) come close to each other when receiving the external force against the elastic force exerted by the coil spring 53. That is, the pair of arm members 41 and 41 can pivot respectively about the pivot shafts 34 and 34 as a pivot center and a line perpendicular to the longitudinal direction of the track rail 11 as the pivot axis.

Furthermore, a ball holding hole 45 for holding one ball 55 in a freely rolling state is formed between the installation positions of the pivot shaft 34 and the coil spring 53 for the shaft-shaped arm member 41. The ball 55 is arranged in a freely rolling state in the ball holding hole 45, and furthermore, the ball 55 is disposed between the facing faces of an upper face of the track rail 11 and an inner face 35 formed in the clamper main body 31 (details of "the inner face 35" will be described later.). When the pair of arm members 41 and 41 performs an pivot operation respectively around the pivot shafts 34 and 34 as a pivot center and a line perpendicular to the longitudinal direction of the track rail 11 as a pivot axis, the ball 55 performs a rolling motion between the facing faces of the upper face, which is one face of the track rail 11, and the inner face formed in the clamper main body 31, so that the ball 55 guides the pivot operation performed by the pair of arm members 41 and 41.

Furthermore, a wire cable 61 is installed to connect the pair of arm members 41 and 41 at the position where the coil spring 53 is installed in the pair of arm members 41 and 41, that is, at the position on the other ends of the shaft-shaped arm members 41. The wire cable 61 is configured to include a wire 62 which build a bridge so as to connect the other ends of the pair of arm members 41 and 41, a nipple 63 fixedly installed at the distal end of the wire 62, and an outer tube 64 covering the wire 62 in the state where the wire is axially movable. Since the wire cable 61 is, as shown in FIGS. 3A and 3B, installed so as to sandwich the other ends of the pair of arm members 41 and 41 by the nipple 63 and the outer tube 64, it is possible to generate an external force for pivoting the arm members in the direction in which the other ends of the pair of arm members 41 and 41 come close to each other, that is, an external force against the elastic force exerted by the coil spring 53 by pulling the wire 62 so as to narrow the distance between the nipple 63 and the outer tube 64.

In addition, it is possible to attach, to the wire cable 61, a handle and the like (not shown) for pulling the wire 62, and it is possible to apply to this handle and the like the mechanism used for the brake system of a bicycle, for example. By applying such a known mechanism, a suitable operation of the wire cable 61 in accordance with the present embodiment can be achieved.

Figure 5A:
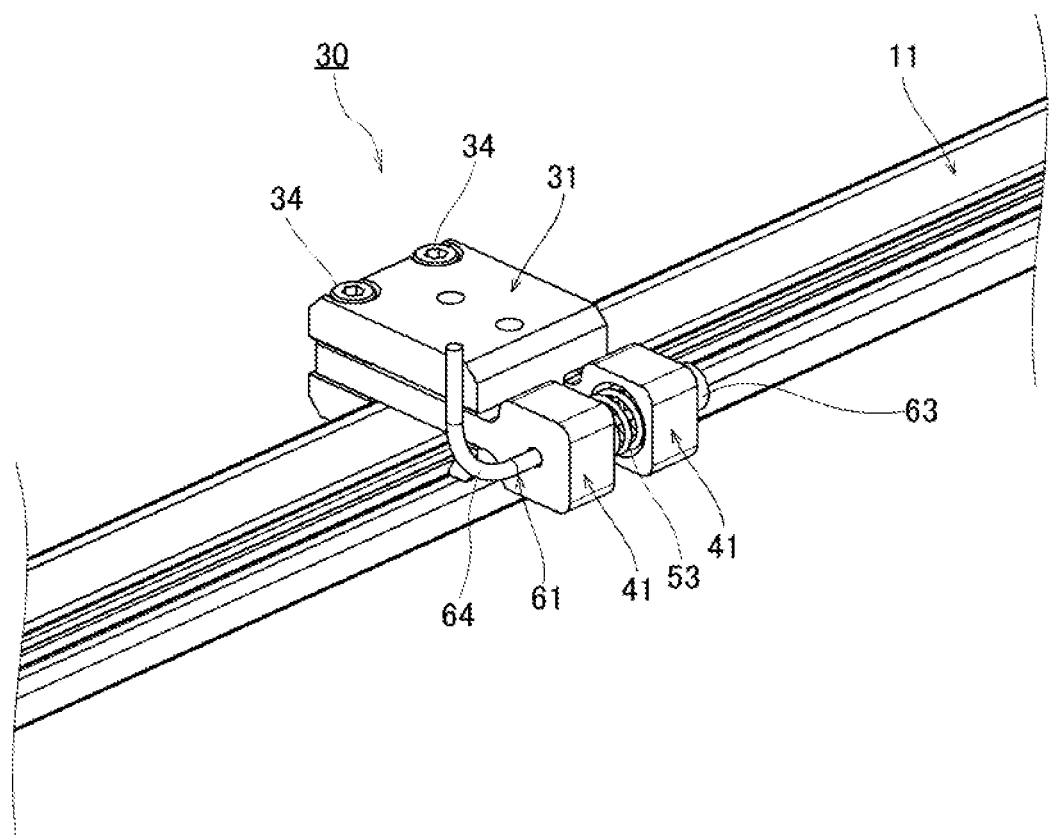
FIG. 5A is a diagram showing a case where the motion guide device clamper mechanism in accordance with the present embodiment is in a restrained state, and in particular, shows an external perspective view when viewed from diagonally above on the front side.
Figure 5B:
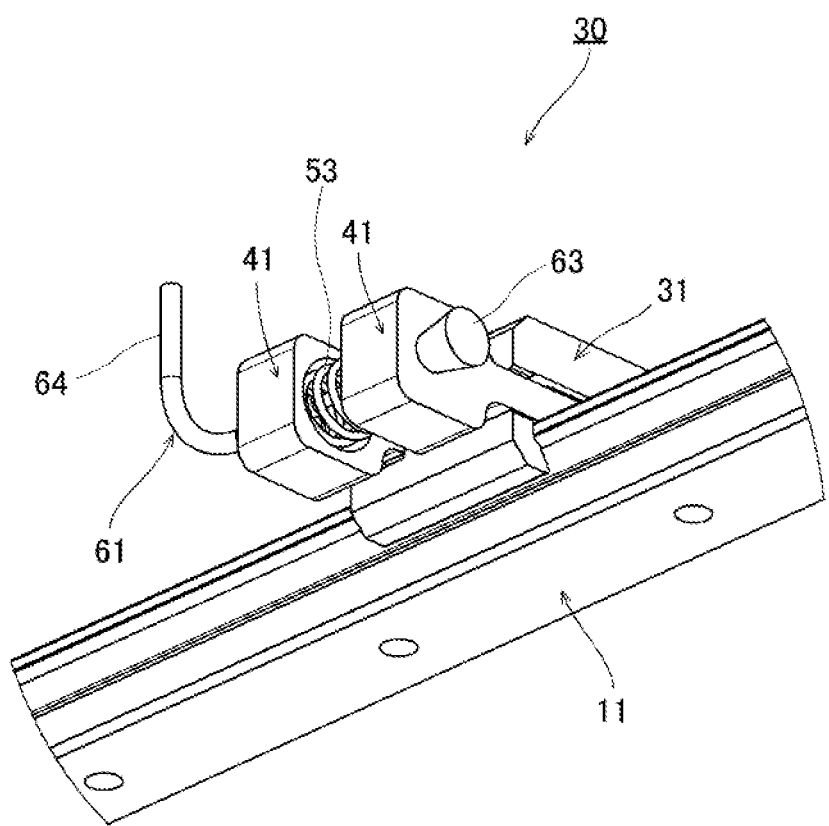
FIG. 5B is a diagram showing a case where the motion guide device clamper mechanism in accordance with the present embodiment, is in a restrained state, and in particular, shows an external perspective view when viewed from diagonally below on the front side.
Figure 5C:
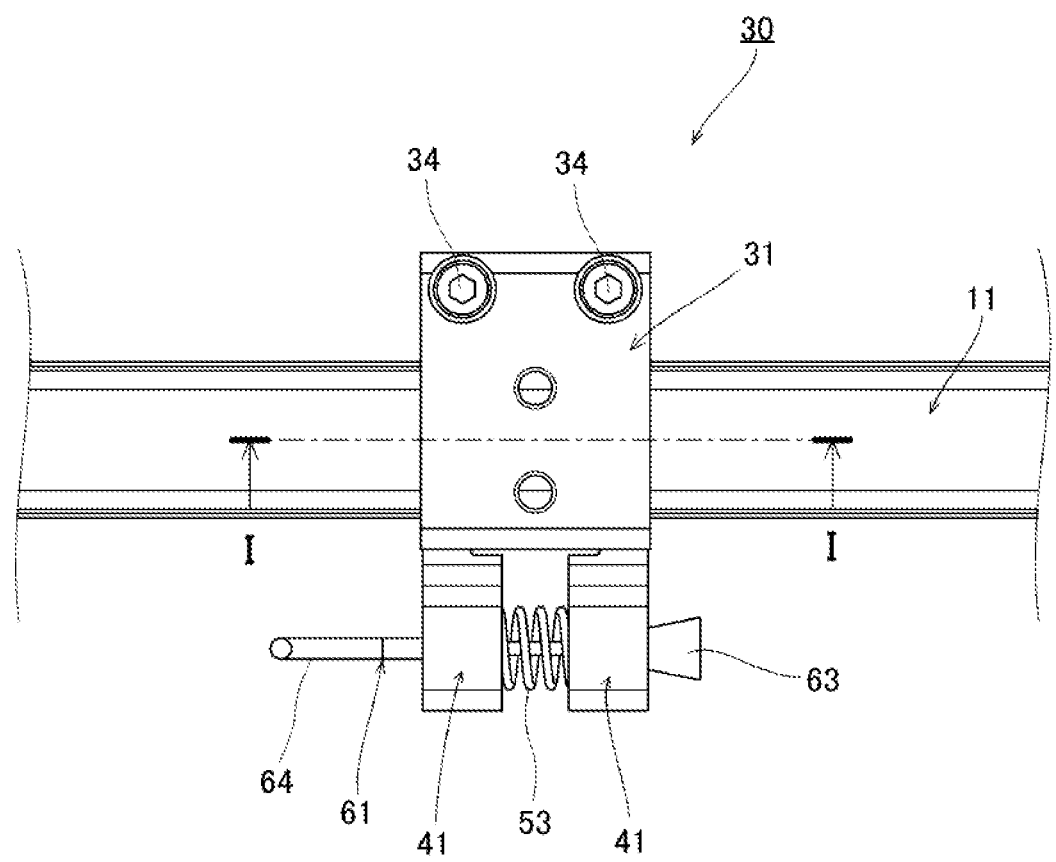
FIG. 5C is a diagram showing a case where the motion guide device clamper mechanism in accordance with the present embodiment is in a restrained state, and in particular, shows an external top view.
Figure 5D:
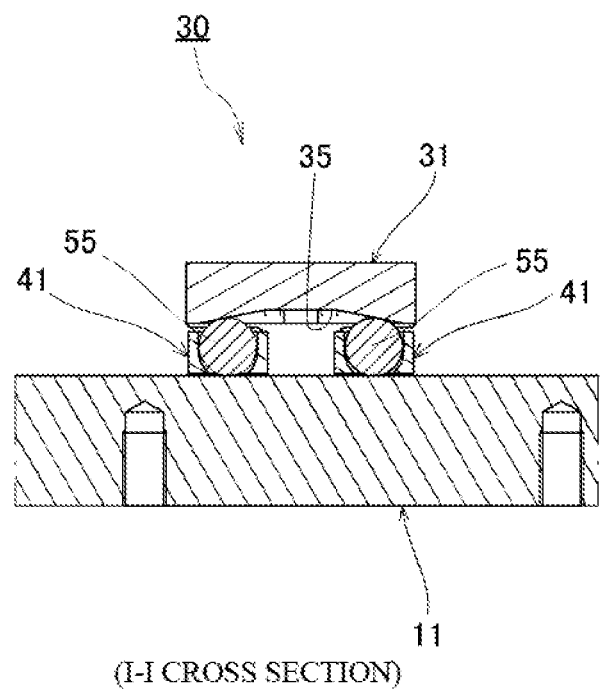
FIG. 5D is a diagram showing a case where the motion guide device clamper mechanism in accordance with the present embodiment is in a restrained state, and in particular, shows an I-I cross section in FIG. 5C.
Figure 6A:
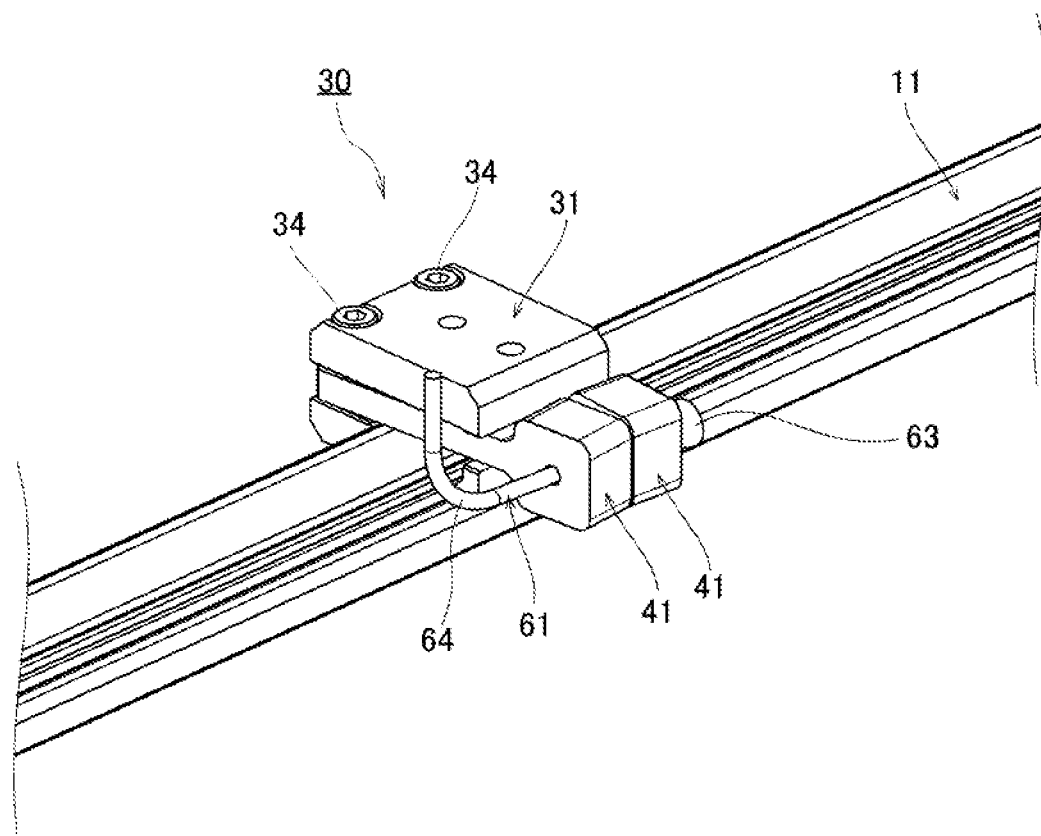
FIG. 6A is a diagram showing a case where a motion guide device clamper mechanism in accordance with the present embodiment is in a non-restrained state, and in particular, shows an external perspective view when viewed from diagonally above on the front side.
Figure 6B:
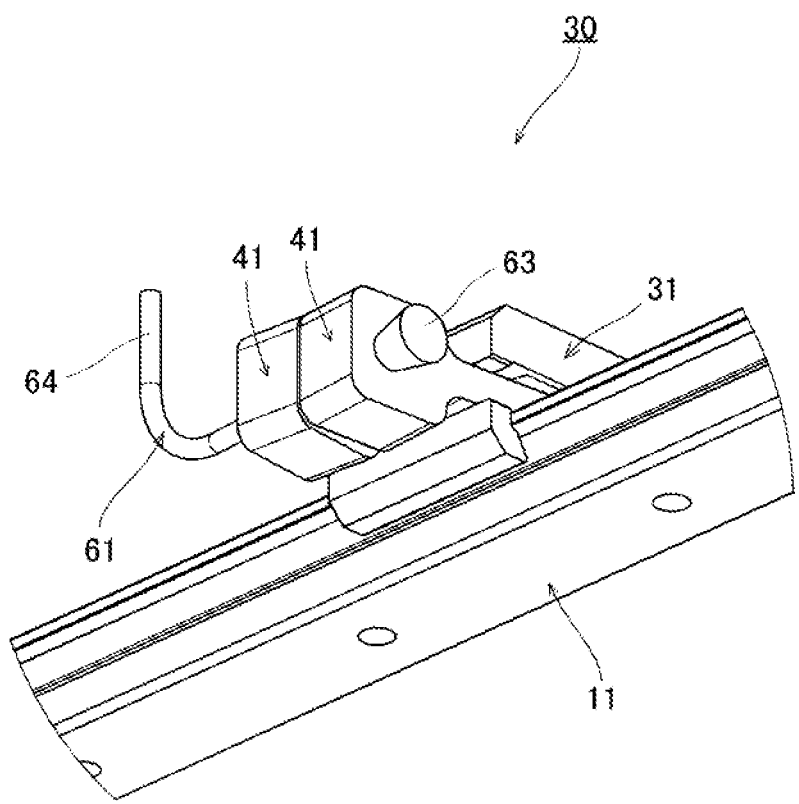
FIG. 6B is a diagram showing a case where the motion guide device clamper mechanism in accordance with the present embodiment is in a non-restrained state, and in particular, shows an external perspective view when viewed from diagonally below on the front side.
Figure 6C:
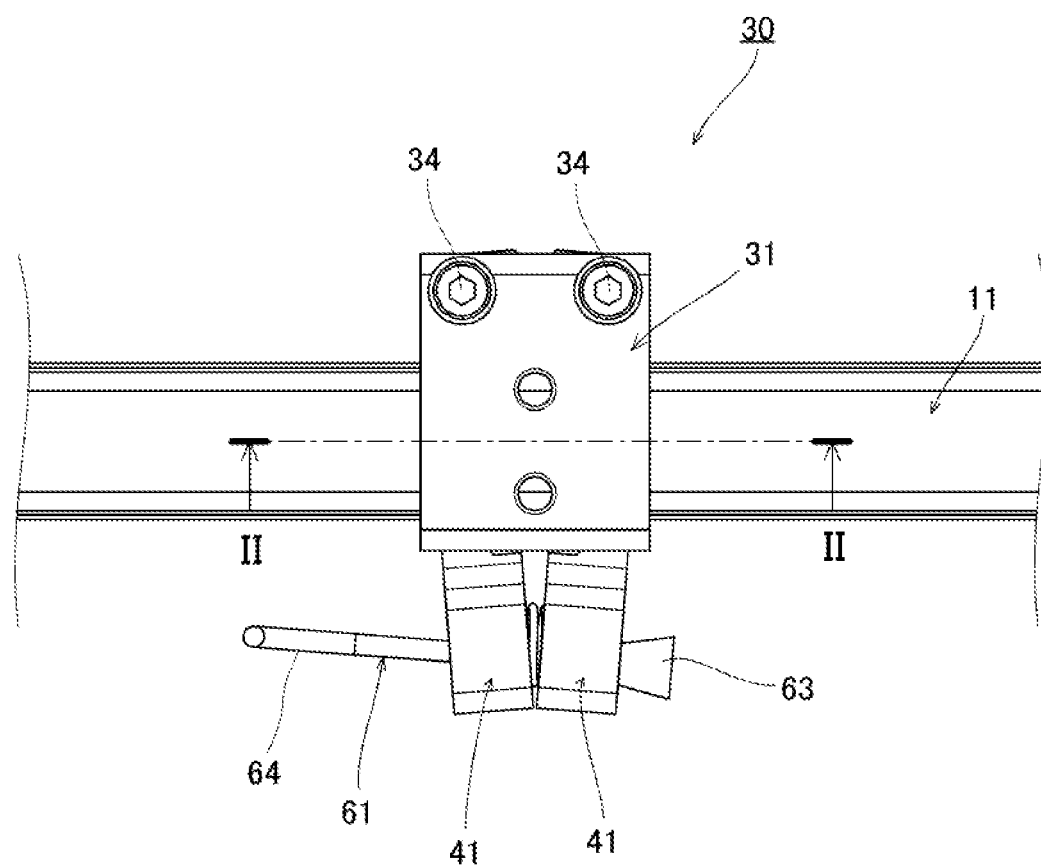
FIG. 6C is a diagram showing a case where the motion guide device clamper mechanism in accordance with the present embodiment is in a non-restrained state, and particularly shows an external top view.
Figure 6D:
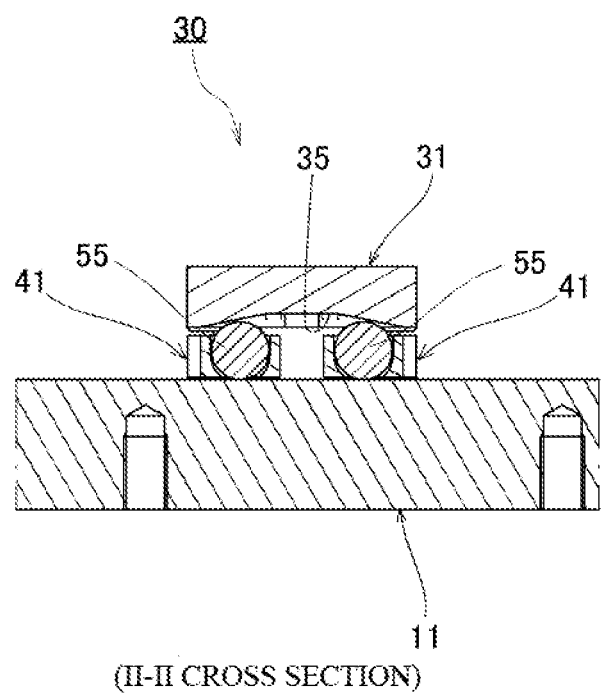
FIG. 6D is a diagram showing a case where the motion guide device clamper mechanism in accordance with the present embodiment is in a non-restrained state, and in particular, shows a II-II cross section in FIG. 6C.

The basic configuration of the motion guide device clamper mechanism 30 in accordance with the present embodiment has been described above. Next, specific features and operations of the motion guide device clamper mechanism 30 in accordance with the present embodiment will be described with reference to FIGS. 5A to 6D. Here, FIGS. 5A to 5D are diagrams showing a case where the motion guide device clamper mechanism in accordance with the present embodiment is in a restrained state. In particular, FIG. 5A shows an external perspective view when viewed from diagonally above on the front side, FIG. 5B shows an external perspective view when viewed from diagonally below on the front side, FIG. 5C shows an external top view, and FIG. 5D shows an I-I cross section in FIG. 5C. Further, FIGS. 6A to 6D are diagrams showing a case where the motion guide device clamper mechanism in accordance with the present embodiment is in the non-restrained state. In particular, FIG. 6A shows an external perspective view when viewed from diagonally above on the front side, FIG. 6B shows an external perspective view when viewed from diagonally below on the front side, FIG. 6C shows an external top view, and FIG. 6D shows the II-II cross section in FIG. 6C.

As mentioned above, in the motion guide device clamper mechanism 30 in accordance with the present embodiment, the ball holding hole 45 for holding one ball 55 in a freely rolling state is formed between the installation positions of the pivot shaft 34 of the shaft-shaped arm member 41 and the coil spring 53, so that one ball 55 is disposed in a freely rolling state in the ball holding hole 45. The ball 55 is disposed between the facing faces of the upper face, which is one face of the track rail 11, and the inner face 35 formed in the clamper main body 31. Here, the shape of the inner face 35 formed in the clamper main body 31 is clearly shown by FIGS. 5D and 6D.

The inner face 35 formed in the clamper main body 31 in accordance with the present embodiment is a portion formed as the inner face of the upper part of the clamper main body 31, that is, the side opposite the open side of the substantially inverted U-shaped "U". The inner face 35 of the clamper main body 31 in accordance with the present embodiment is formed in a tapered shape such that the distance between the facing faces is narrow as it goes to the end of the upper face of the track rail 11. Therefore, when the pair of arm members 41 and 41 perform a fan-like operation, the balls 55 held by the ball holding holes 45 formed in the pair of arm members 41 and 41 perform a rolling operation between the upper face of the track rail 11 and the inner face 35 of the clamper main body 31 formed in a tapered shape.

As shown in FIGS. 5A-5D, in a normal state in which the other ends of the pair of arm members 41 and 41 are pivoted away from each other by the elastic force exerted by the coil spring 53, the pair of balls 55 installed one by one in the pair of arm members 41 and 41 receives an elastic force toward the position at which the distance between the facing faces of the upper face of the track rail 11 and the inner face 35 of the clamper main body 31 is narrow, that is, toward the left and right direction of the paper in FIG. 5D, so that the balls 55 are subjected to a frictional force based on the taper shape, and the clamper main body 31 with respect to the track rail 11 is restrained.

On the other hand, when the wire cable 61 is driven to pull the wire 62, as shown in FIGS. 6A-6D, the pair of arm members 41 and 41 receives an external force that resists the elastic force exerted by the coil spring 53, so that the pair of arm members 41 and 41 pivots in the direction in which the other ends come to close to each other. At this time, the pair of balls 55 installed one by one in the pair of arm members 41 and 41 retracts from a position where the distance between the facing faces of the upper face of the track rail 11 and the inner face 35 of the clamper main body 31 is narrow. That is, since the balls receive the external force so as to move to the left and right direction of the paper in FIG. 6D, the balls 55 are released from the frictional force based on the tapered shape, and the non-restrained state of the clamper main body 31 with respect to the track rail 11 is achieved.

In addition, since the pair of arm members 41 and 41 is used for the motion guide device clamper mechanism 30 in accordance with the present embodiment, the force increasing function according to the lever principle is provided, so that the effect of unlocking can be obtained even with a small force by the force increasing function.

In this way, in the motion guide device clamper mechanism 30 in accordance with the present embodiment, the fan-like operation of the pair of arm members 41 and 41 is performed by driving the wire cable 61, so that it is possible to easily achieve the restrained/non-restrained state of the clamper main body 31 with respect to the track rail 11. Further, by connecting the clamper main body 31 in accordance with the present embodiment with the movable block 13 of the linear guide 10, the movable block 13 can be restrained/not restrained at any position in the longitudinal direction of the track rail 11. Therefore, according to the motion guide device clamper mechanism 30 in accordance with the present embodiment, positioning of the movable block 13 with respect to the track rail 11 can be performed easily and reliably with a high degree of freedom.

Note that in the motion guide device clamper mechanism 30 in accordance with the present embodiment, the height dimension of the clamper main body 31 is equal to or smaller than the height dimension of the movable block 13 of the linear guide 10. This configuration is achieved when the pair of arm members 41 and 41, which is members for performing restraint and non-restraint of the clamper main body 31 with respect to the track rail 11 is formed to protrude laterally beyond the dimension in the width direction of the track rail 11, which is a direction orthogonal to the longitudinal direction, when viewing the linear guide 10 from the upper face (see FIGS. 5C and 6C). With these configurations, when applied to the linear guide 10, the motion guide device clamper mechanism 30 in accordance with the present embodiment exhibits the advantage that the external dimension in the height direction of the linear guide 10 is not increased. Such an advantage brings about an effect that cannot be achieved by the prior art. For example, in the linear guide 10, when the track rail 11 is attached to a base member such as a base, and the guide object is attached to the movable block 13, since the motion guide device clamper mechanism 30 in accordance with the present embodiment has a mechanism that achieves both weight reduction and size reduction simultaneously, it is possible to maintain a suitable guide accuracy without disturbing the movement of the attachment member described above.

As mentioned above, although the suitable embodiment of the present invention is described, the technical scope of the present invention is not limited to the range given in the above-mentioned embodiment. It is possible to add various change or improvement to the above-mentioned embodiment.

For example, in the embodiment described above, a configuration is illustrated in which one ball holding hole 45 is formed for one shaft-shaped arm member 41, and one ball 55 is disposed. That is, the configuration is illustrated in which the balls 55 are disposed one by one for each of the pair of arm members 41 and 41, but the number of balls 55 arranged for one arm member 41 may be plural. For example, even in the case where two balls 55 are disposed for each of the pair of arm members 41 and 41, it is possible to achieve a motion guide device clamper mechanism which can exhibit the same function and effect as the embodiment described above. When two balls 55 are disposed for each of the pair of arm members 41 and 41, the amount of ball 55 biting into the tapered shape is adjusted by for example, changing the diameter of the ball 55, changing the taper shape of the inner face 35, and the like with respect to the embodiment described above, so that it is possible to obtain the same function and effect as those of the embodiment described above.

Moreover, although it is preferable that the rolling member disposed with respect to the arm member 41 be the ball 55 as in this embodiment mentioned above, it is also possible to use another rolling member as long as a pair of arm members 41 and 41 can pivot around the pivot shafts 34 and 34 respectively as a pivot center and around a line perpendicular to the longitudinal direction of the track rail 11 as a pivot axis. For example, rolling members of any shape, such as cylindrical rollers, drum-shaped drum rollers, rollers, etc., can be applied to the present invention.

Further, in the embodiment described above, the coil spring 53 installed so as to be sandwiched by the pair of arm members 41 and 41 exerts an elastic force so that the pair of arm members 41 and 41 pivots in a direction in which the other ends of the pair of arm members 41 and 41 (that is, the coil spring 53 installation side) is away from each other. Therefore, the present embodiment is configured such that in the normal state, the pair of arm members 41 and 41 pivots, by the elastic force exerted by the coil spring 53, in a direction in which the other ends of the pair of arm members 41 and 41 (that is, the coil spring 53 installation side) is away from each other, so that the restrained state by the motion guide device clamper mechanism 30 in accordance with the present embodiment is achieved, and on the other hand, the pair of arm members 41 and 41 pivots, by operating the wire cable 61 and applying an external force against the elastic force exerted by the coil spring 53, in a direction in which the other ends of the pair of arm members 41 and 41 (that is, the coil spring 53 installation side) come close to each other, so that the non-restrained state by the motion guide device clamper mechanism 30 in accordance with the present embodiment is achieved. However, in the present invention, instead of using the coil spring 53 as a compression spring as used in the present embodiment, it is also possible to use a coil spring as a tension spring. That is, in the present invention, the configuration may be such that in the normal state, the pair of arm members 41 and 41 pivots, by the elastic force exerted by the tension spring, in a direction in which the other ends of the pair of arm members 41 and 41 (that is, the tension spring installation side) come close to each other, so that the non-restrained state by the motion guide device clamper mechanism 30 in accordance with the present embodiment is achieved, and on the other hand, the pair of arm members 41 and 41 pivots, by operating the wire cable 61 and applying an external force against the elastic force exerted by the tension spring, in a direction in which the other ends of the pair of arm members 41 and 41 (that is, the tension spring installation side) is away from each other, so that the restrained state by the motion guide device clamper mechanism in accordance with the present invention is achieved.

Figure 7A:
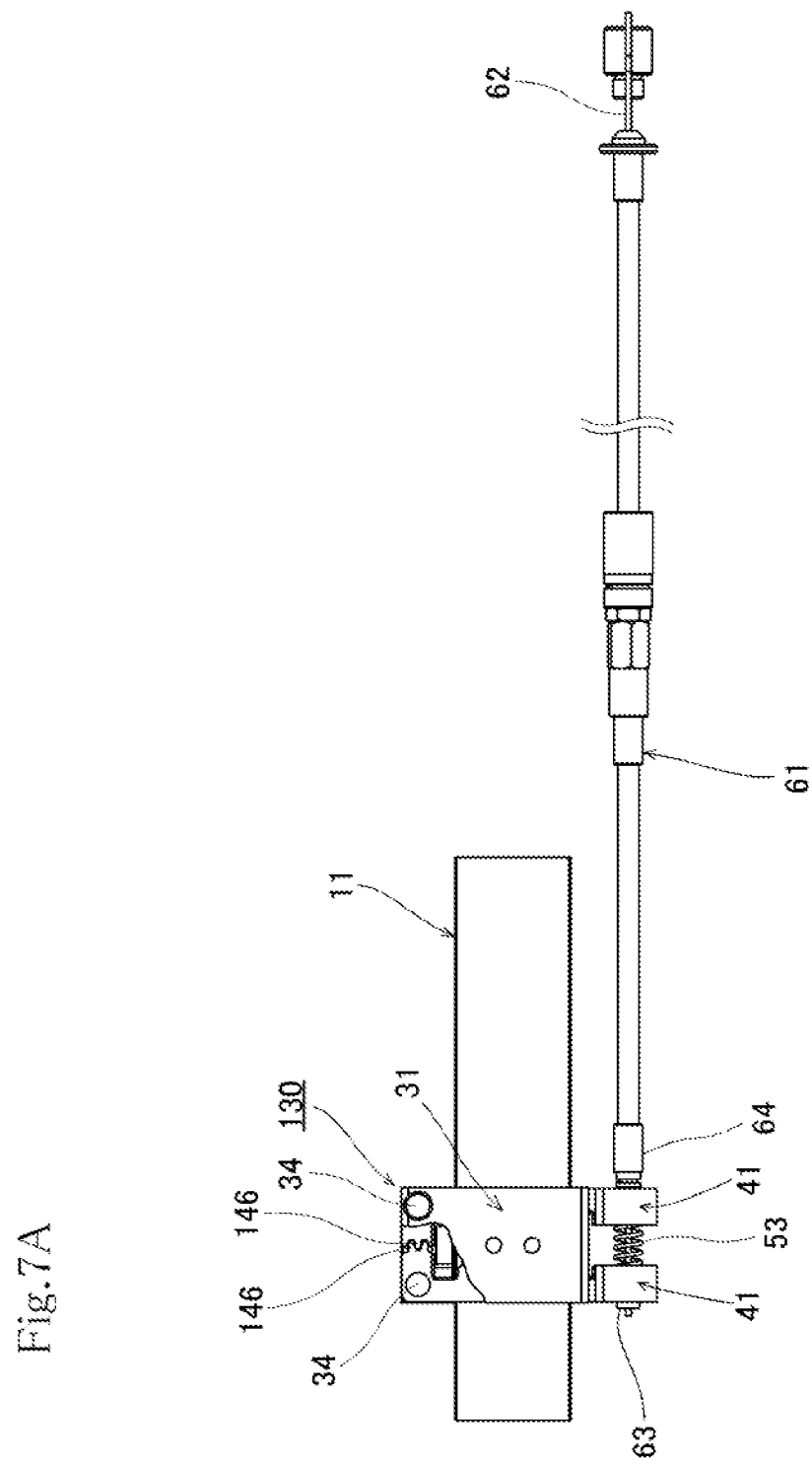
FIG. 7A is a partially cutaway view showing one of various improvements which can be taken by the motion guide device clamper mechanism in accordance with the present invention, and shows a restrained state of the clamper main body with respect to the track rail.

Further, it is possible to improve the pair of arm members 41 and 41 in order to make the fan-shaped pivot operation performed by the pair of arm members 41 and 41 according to the embodiment described above more reliable and smooth. Such an improvement is shown in FIGS. 7A and 7B. Here, FIG. 7A is a partially cutaway view showing one of various improvements which can be taken by the motion guide device clamper mechanism in accordance with the present invention, and shows the restrained state of the clamper main body 31 with respect to the track rail 11. Further, FIG. 7B is a partially cutaway view showing one of various improvements which can be taken by the motion guide device clamper mechanism in accordance with the present invention, and shows the non-restrained state of the clamper main body 31 with respect to the track rail 11. Although it is clear from the point where the clamper main body 31 is cutaway and shown in FIGS. 7A and 7B, in the motion guide device clamper mechanism 130 according to this improvement, gear shapes 146 and 146 as an engagement shape part are formed in the one end (the upper side of the paper in FIGS. 7A and 7B) of the shaft-shaped arm member for each of the pair of arm members 41 and 41. A pair of arm members 41 and 41 concerning this improvement is attached to the clamper main body 31 so that the gear shapes 146 and 146 formed in the arm members will be in an engagement state. Therefore, in the motion guide device clamper mechanism 130 according to the improvement, when the other ends of the pair of arm members 41 and 41 (that is, the coil spring 53 installation side) pivot in a direction in which the arm members are away from or come close to each other, the pair of arm members 41 and 41 is configured to surely pivot in conjunction with each other. Such a configuration achieves a reliable operation of a motion guide device clamper mechanism 130 according to the improvement. For example, as shown in FIGS. 7A and 7B, it can be assumed that the pair of arm members 41 and 41 cannot pivot equally when the wire cable 61 is arranged linearly. However, the gear shapes 146 and 146 are formed on the pair of arm members 41 and 41, respectively, and the engagement state where these are engaged is achieved, so that both of the pair of arm members 41 and 41 can surely pivot equally. That is, according to the motion guide device clamper mechanism 130 according to the present improvement, stable operation can surely be performed under any use environment, and a constrained/non-restrained state can be reliably achieved. Note that in FIGS. 7A and 7B, although the case where the gear shapes 146 and 146 as an engagement shape part are formed is illustrated, any shape may be used with respect to the engagement shape part in accordance with the present invention as long as the function and effect same as those of the gear shapes 146 and 146 can be obtained, and for example, in place of the gear shapes 146 and 146, an engagement shape part having a serration shape may be employed.

Figure 9B:
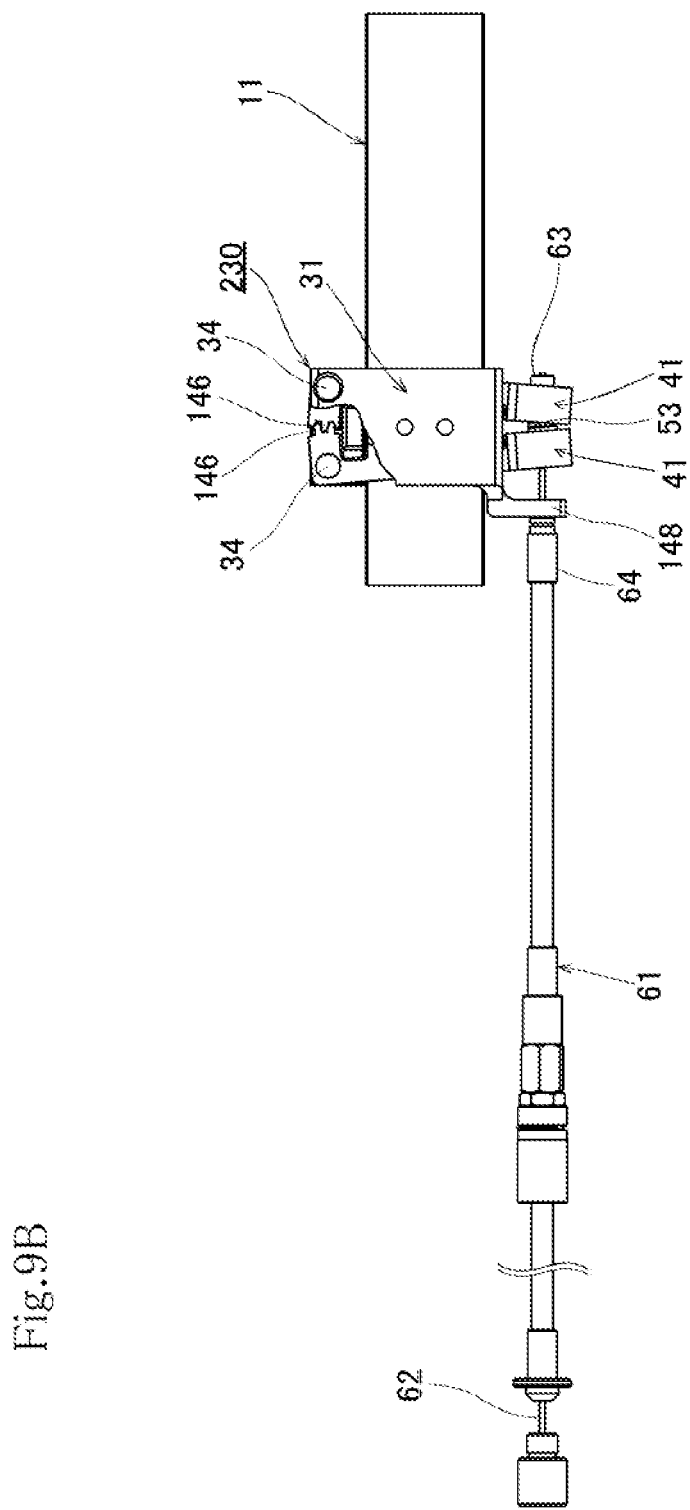
FIG. 9B is a diagram showing a modification of the motion guide device clamper mechanism according to another modification in accordance with the present invention shown in FIGS. 8A and 8B, showing a non-restrained state of the clamper main body with respect to the track rail.

Further, for example, the motion of the wire cable 61 can be made more stable by further improving the motion guide device clamper mechanism 130 according to the improvement shown in FIGS. 7A and 7B. FIGS. 8A and 8B show the specific improvement. Here, FIG. 8A is a partially cutaway view showing another improvement of the motion guide device clamper mechanism in accordance with the present invention, showing a restrained state of the clamper main body 31 with respect to the track rail 11. FIG. 8B is a partially cutaway view showing another improvement of the motion guide device clamper mechanism in accordance with the present invention, showing a non-restrained state of the clamper main body 31 with respect to the track rail 11. In a motion guide device clamper mechanism 230 according to another improvement shown in FIGS. 8A and 8B, a fixed wall face 148 is formed with respect to the clamper main body 31. The fixed wall face 148, as in the pair of arm members 41 and 41, is a member formed to protrude laterally (downward of the paper in FIG. 8A and FIG. 8B) beyond the dimension in the width direction of the track rail 11, which is a direction orthogonal to the longitudinal direction, when the linear guide 10 is viewed from the upper face. Further, the fixed wall face 148 is disposed between the other end of any one of the pair of arm members 41 and 41 and the outer tube 64, and is a member disposed in a state where the outer tube 64 is fixed and installed. Therefore, regardless of the arrangement of the wire cable 61 with respect to the motion guide device clamper mechanism 230, the outer tube 64 and the nipple 63 fixed to the fixed wall face 148 are disposed in a state in which the pair of arm members 41 and 41 are securely sandwiched, so that it is possible to perform the fan-like pivot operation by the pair of arm members 41 and 41 reliably and smoothly when the wire 62 is pulled. Note that FIGS. 9A and 9B are diagrams showing a modification of the motion guide device clamper mechanism according to another modification in accordance with the present invention shown in FIGS. 8A and 8B. FIG. 9A shows the restrained state of the clamper main body 31 with respect to the track rail 11, and FIG. 9B shows the non-restrained state of the clamper main body 31 with respect to the track rail 11. When viewing the clamper main body 31 from the upper face, the fixed wall face 148 formed on the clamper main body 31 may be disposed on the right side of the paper of the clamper main body 31 as shown in FIGS. 8A and 8B, and may be disposed on the left side of the paper of the clamper main body 31 as shown in FIGS. 9A and 9B. That is, the fixed wall face 148 according to another improvement can be used corresponding to all the use conditions of the motion guide device clamper mechanism 230.

Note that although FIGS. 8A to 9B show an embodiment in which both the gear shape 146 and the fixed wall face 148 are provided, it is also possible to provide only one of the gear shape 146 and the fixed wall face 148 with respect to the motion guide device clamper mechanism in accordance with the present invention.

It is also apparent from the scope of the claims that the embodiments adding such modifications or improvements can be included in the technical scope of the present invention.

REFERENCE NUMERALS

10: linear guide, 11: track rail, 11a: rolling member rolling groove, 11b: bolt hole, 12: ball, 13: movable block, 13a: loaded rolling member rolling groove, 15: end seal, 17: lid, 22: loaded rolling member rolling passage, 23: non-loaded rolling member rolling passage, 25: turnabout passage, 30, 130, 230: motion guide device clamper mechanism, 31: clamper main body, 32: attachment hole, 34: pivot shaft, 35: inner face, 41: arm member, 42: shaft hole 43: attachment hole, 45: ball holding hole, 53: coil spring 55: ball, 61: wire cable, 62: wire, 63: nipple, 64: outer tube, 146: gear shape, 148: fixed wall face

The invention claimed is:

1. A motion guide device clamper mechanism including a track member formed to extend in a longitudinal direction, and a movable member attached to the track member via a plurality of rolling members, the movable member being attached to a motion guide device relatively reciprocally movable in the longitudinal direction of the track member, the movable member being restrained/non-restrained at any position in the longitudinal direction of the track member to position the movable member with respect to the track member, the motion guide device clamper mechanism comprising:
   a clamper main body connected to the movable member;
   an inner face formed on the clamper main body, the inner face facing one face of the track member, the inner face having a tapered shape in a manner in which a distance between the one face of the track member and the inner face is narrower toward an end of the one face of the track member; and
   one or more rolling members disposed between the facing faces of the one face of the track member and the inner face, wherein
   the one or more rolling members receives a pressing force toward a position where the distance between the one face of the track member and the inner face of the clamper main body is narrow, a frictional force based on the tapered shape acts on the one or more rolling members, and restraint of the clamper main body with respect to the track member is performed, wherein
   the frictional force based on the tapered shape is released by retracting the one or more rolling members from a position where the distance between the facing faces of the one face of the track member and the inner face of the clamper main body is narrow, and non-constraint of the clamper main body with respect to the track member is performed, and wherein further,
   a member for performing restraint/non-restraint of the clamper main body with respect to the track member is, when viewing the motion guide device from an upper face, formed to extend laterally beyond a dimension in a width direction of the track member, the width direction being a direction orthogonal to the longitudinal direction.

2. A motion guide device clamper mechanism including a track member formed to extend in a longitudinal direction, and a movable member attached to the track member via a plurality of rolling members, the movable member being attached to a motion guide device relatively reciprocally movable in the longitudinal direction of the track member, the movable member being restrained/non-restrained at any position in the longitudinal direction of the track member to position the movable member with respect to the track member, the motion guide device clamper mechanism comprising:
   a clamper main body together with the movable member reciprocally movable along the longitudinal direction of the track member; and
   a pair of shaft-shaped arm members attached to the clamper main body, wherein
   each of the pair of arm members is attached to the clamper main body at one end of each of the shaft-shaped arm members via one pivot shaft, and is made to be pivotable around a line perpendicular to the longitudinal direction of the track member as a pivot axis, wherein
   an elastic body having an elastic force so as to be sandwiched by the pair of arm members at the other ends of the shaft-shaped arm members is installed, the pair of arm members pivots ordinarily by an elastic force exerted by the elastic body in a direction in which the other ends of the pair of arm members are away from or come close to each other, and when receiving an external force against the elastic force exerted by the elastic body, the pair of arm members pivots in a direction in which the other ends of the pair of arm members come close to or are away from each other, and is made to be pivotable around the line perpendicular to the longitudinal direction of the track member as the pivot axis, wherein
   one or more rolling members are disposed in a freely rolling state between the pivot axis and an installation position of the elastic body of each of the shaft-shaped arm members, wherein
   the one or more rolling members are disposed between facing faces of one face of the track member and an inner face formed on the clamper main body, wherein further,
   the inner face of the clamper main body is formed to have a tapered shape in a manner in which a distance between the facing faces is narrower toward an end of the one face of the track member, wherein
   when the pair of arm members pivots in a direction in which the other ends of the pair of arm members are away by an elastic force exerted by the elastic body or an external force against the elastic force exerted by the elastic body, a frictional force based on the tapered shape acts on the one or more rolling members, the one or more rolling members receiving the elastic force toward a position where the distance between, the facing faces of the one face of the track member and the inner face of the clamper main body is narrow, and restraint of the clamper main body with respect to the track member is performed, wherein
   when the pair of arm members pivots in a direction in which the other ends of the pair of arm members come close by an elastic force exerted by the elastic body or an external force against the elastic force exerted by the elastic body, a frictional force based on the tapered shape is released by retracting the one or more rolling members from a position where the distance between the facing faces of the one face of the track member and the inner face of the clamper main body is narrow, and non-restraint of the clamper main body with respect to the track member is performed.

3. The motion guide device clamper mechanism according to claim 2, wherein
   a height dimension of the clamper main body is equal to or smaller than a height dimension of the movable member.

4. The motion guide device clamper mechanism according to claim 3, wherein
   the elastic body is configured as a coil spring.

5. The motion guide device clamper mechanism according to claim 3, wherein
   a wire cable is installed to connect the pair of arm members at the other ends of the axially formed arm members, wherein
   the wire cable includes
   a wire bridged so as to connect the other ends of the pair of arm members, a nipple fixedly installed at a distal end of the wire, and an outer tube covering the wire, the wire being axially movable, wherein by pulling the wire so as to narrow a distance between the nipple and the outer tube in a state in which the nipple and the outer tube sandwich the other ends of the pair of arm members, an external force against the elastic force exerted by the elastic body is generated, the external force pivoting the arm members in the direction in which the other ends of the pair of arm members come close.

6. The motion guide device clamper mechanism according to claim 3, wherein each of the pair of arm members has an engagement shape part at one end of each of the shaft-shaped arm members, wherein by attaching the pair of arm members to the clamper main body in a manner in which the engagement shape part formed on each of the pair of arm members is in a engaged state, when the arm members pivot in a direction in which the other ends of the pair of the arm members are away from or come close to each other, the pair of arm members pivots in conjunction with each other.

7. The motion guide device clamper mechanism according to claim 2, wherein the elastic body is configured as a coil spring.

8. The motion guide device clamper mechanism according to claim 7, wherein a wire cable is installed to connect the pair of arm members at the other ends of the axially formed arm members, wherein the wire cable includes a wire bridged so as to connect the other ends of the pair of arm members, a nipple fixedly installed at a distal end of the wire, and an outer tube covering the wire, the wire being axially movable, wherein by pulling the wire so as to narrow a distance between the nipple and the outer tube in a state in which the nipple and the outer tube sandwich the other ends of the pair of arm members, an external force against the elastic force exerted by the elastic body is generated, the external force pivoting the arm members in the direction in which the other ends of the pair of arm members come close.

9. The motion guide device clamper mechanism according to claim 7, wherein each of the pair of arm members has an engagement shape part at one end of each of the shaft-shaped arm members, wherein by attaching the pair of arm members to the clamper main body in a manner in which the engagement shape part formed on each of the pair of arm members is in a engaged state, when the arm members pivot in a direction in which the other ends of the pair of the arm members are away from or come close to each other, the pair of arm members pivots in conjunction with each other.

10. The motion guide device clamper mechanism according to claim 2, wherein a wire cable is installed to connect the pair of arm members at the other ends of the axially formed arm members, wherein the wire cable includes a wire bridged so as to connect the other ends of the pair of arm members, a nipple fixedly installed at a distal end of the wire, and an outer tube covering the wire, the wire being axially movable, wherein by pulling the wire so as to narrow a distance between the nipple and the outer tube in a state in which the nipple and the outer tube sandwich the other ends of the pair of arm members, an external force against the elastic force exerted by the elastic body is generated, the external force pivoting the arm members in the direction in which the other ends of the pair of arm members come close.

11. The motion guide device clamper mechanism according to claim 10, wherein the clamper main body includes a fixed wall face disposed between the other end of any one of the pair of arm members and the outer tube, the outer tube being fixedly installed at the fixed wall face.

12. The motion guide device clamper mechanism according to claim 11, wherein each of the pair of arm members has an engagement shape part at one end of each of the shaft-shaped arm members, wherein by attaching the pair of arm members to the clamper main body in a manner in which the engagement shape part formed on each of the pair of arm members is in a engaged state, when the arm members pivot in a direction in which the other ends of the pair of the arm members are away from or come close to each other, the pair of arm members pivots in conjunction with each other.

13. The motion guide device clamper mechanism according to claim 10, wherein each of the pair of arm members has an engagement shape part at one end of each of the shaft-shaped arm members, wherein by attaching the pair of arm members to the clamper main body in a manner in which the engagement shape part formed on each of the pair of arm members is in a engaged state, when the arm members pivot in a direction in which the other ends of the pair of the arm members are away from or come close to each other, the pair of arm members pivots in conjunction with each other.

14. The motion guide device clamper mechanism according to claim 2, wherein each of the pair of arm members has an engagement shape part at one end of each of the shaft-shaped arm members, wherein by attaching the pair of arm members to the clamper main body in a manner in which the engagement shape part formed on each of the pair of arm members is in a engaged state, when the arm members pivot in a direction in which the other ends of the pair of the arm members are away from or come close to each other, the pair of arm members pivots in conjunction with each other.

15. The motion guide device clamper mechanism according to claim 14, wherein the engagement shape part is formed in a gear shape or a serration shape.

* * * * *